United States Patent
Matsuura et al.

[11] Patent Number: 6,120,830
[45] Date of Patent: Sep. 19, 2000

[54] PROCESS FOR PRODUCING TOFU

[75] Inventors: Masaru Matsuura; Yoshiro Yamanaka; Shigeru Noguchi; Jun Sasaki; Tomoko Takeuchi, all of Chiba Pref., Japan

[73] Assignee: Kikkoman Corporation, Noda, Japan

[21] Appl. No.: 09/238,429

[22] Filed: Jan. 28, 1999

[30] Foreign Application Priority Data

Feb. 10, 1998 [JP] Japan .................................. 10-043000

[51] Int. Cl.$^7$ ...................................................... A23J 3/00
[52] U.S. Cl. ............................. 426/573; 426/401; 426/634
[58] Field of Search ..................................... 426/634, 520, 426/512, 401, 573

[56] References Cited

U.S. PATENT DOCUMENTS

| | | | |
|---|---|---|---|
| 4,140,811 | 2/1979 | Ogasa et al. | 426/634 |
| 4,826,701 | 5/1989 | Joo et al. | 426/573 |

FOREIGN PATENT DOCUMENTS

| | | |
|---|---|---|
| 58-51865 | 3/1983 | Japan . |
| 9-322731 | 12/1997 | Japan . |

*Primary Examiner*—Gabrielle Brouillette
*Assistant Examiner*—Hao Mai
*Attorney, Agent, or Firm*—Young & Thompson

[57] ABSTRACT

A process for producing tofu comprising primarily heating soybean milk containing a coagulant, packing the soybean milk into a container, and secondarily heating the soybean milk to coagulate.

7 Claims, 3 Drawing Sheets

PROCESS FOR PRODUCING TOFU

BACKGROUND OF THE INVENTION

1. Field of the Invention

The present invention relates to a novel process for producing tofu (bean curd).

2. Description of the Related Art

Tofu is roughly divided into two types, momen (pressed) tofu and silken tofu. Silken tofu is further divided according to the process of preparation into (1) cut tofu which is obtained by coagulating soybean milk in a mold and immersing the coagulated product in water, cutting to size and (2) packed tofu which is obtained by filling a small container of given size with soybean milk containing a coagulant, sealing the container, and coagulating by heat. In a traditional manner, both momen tofu and silken tofu are prepared by pouring hot soybean milk just squeezed out into a mold, mixing natural coagulants such as $MgCl_2$ and $CaCl_2$ into the soybean milk and stirring, and allowing the mixture to stand to completely coagulate. In preparing momen tofu, the coagulated product in the mold is collapsed and transferred into a wooden draining frame with cloth lying therein, then pressed to drain part of contained water and shaped. The resulting tofu is then cut to size and immersed in water. In preparing silken tofu, coagulation is completed within the mold, and the resulting tofu is cut to size and immersed in water.

Nowadays packed tofu predominates over cut tofu from the standpoint of practicability for mass production, convenience in distribution, hygiene, and so forth.

Packed tofu is generally produced by filling a container with cold soybean milk containing a coagulant, sealing the container, and coagulating the soybean milk by heating. On the other hand, there have been proposed a process comprising passing soybean milk through a pipe while causing coagulation by heating and continuously extruding the thus coagulated product from the pipe (see Japanese Patent Laid-Open No. 322731/97) and a process comprising passing soybean milk containing a coagulant through a microwave heating apparatus at a speed that may not coagulate the soybean milk, while microwave heating at 110 to 120° C. for 12 to 20 seconds, and packing the still fluid soybean milk in an arbitrary mold container where the soybean milk is coagulated (see Japanese Patent Laid-Open No. 51865/83).

Quality of tofu consists in not only flavor but texture. A desirable texture depends on whether tofu is to be served as a cooked dish or to be tasted just as warmed or chilled.

While the texture of tofu varies according to the raw soybeans, the method for preparing soybean milk, the protein concentration of soybean milk, the kind and amount of the coagulant, and the like, the texture of tofu prepared in the above-described traditional method can be seen as being decided by the degree of agitation after addition of a coagulant to hot soybean milk. Therefore, tofu prepared by many tofu makers in a traditional manner can naturally have as many textures, namely, on a one-of-a-kind basis.

On the other hand, although packed tofu is advantageous in that a product of a kind can be mass-produced in a continuous manner, it is said to be inferior in texture, which has been one of the reasons of consumers' dislike for packed tofu. While the texture is influenced by such conditions as the method for preparing soybean milk, the protein concentration, the kind of the coagulant, and the like as mentioned above, it is extremely difficult to vary the texture of packed tofu according to the way of serving (e.g., whether to be cooked or to be served chilled or warmed) simply by somewhat altering these conditions. In other words, the greatest decisive factor of the texture of packed tofu resides in the mode of coagulation which consists of heat-coagulating soybean milk as packed in a container.

SUMMARY OF THE INVENTION

The inventors of the invention have studied on a possibility of preparing tofu having varied texture with the whole soybeans, the protein concentration of soybean milk, and the kind and amount of a coagulant being unchanged or a possibility of industrially mass-producing tofu comparable to one prepared by a traditional method. As a result, they have found that tofu texture can be varied on demand by dividing a coagulation step into two stages and that the thus prepared tofu has a satisfactory palatability.

In a conventional process for producing packed tofu, while somewhat different among manufacturers, cold soybean milk containing a coagulant is packed into a container and heated in a single stage. According to the present invention, a two-stage heating step is adopted, in which soybean milk to which a coagulant has been added is heated primarily before being packed into a container, and the primarily heated soybean milk is packed into a container and then heated secondarily to complete coagulation. A change of the primary heating condition results in a change of texture.

According to the present invention, tofu having a varied texture can be obtained by changing the condition of the primary heating before packing soybean milk containing a coagulant into a container. It is therefore possible to produce tofu, even in a continuous manner, with a desired texture, for example, a hard texture, a soft texture or an elastic texture or, a texture selected according to use, for example, a texture suited for being served chilled or warmed.

Further, the tofu obtained through 2-stage heating according to the present invention has a favorable palatability just like one prepared in a traditional manner, with the hardness being set equal to that of packed tofu obtained through 1-stage heating. This seems to be because soybean milk, when heated in a single stage, coagulates slowly and uniformly as a whole to give a uniform texture, whereas the 2-stage heating makes the tofu structure non-uniform to give a complicated texture, which will be manifested as a delicate difference in palatability.

DETAILED DESCRIPTION OF THE INVENTION

Figure 1:
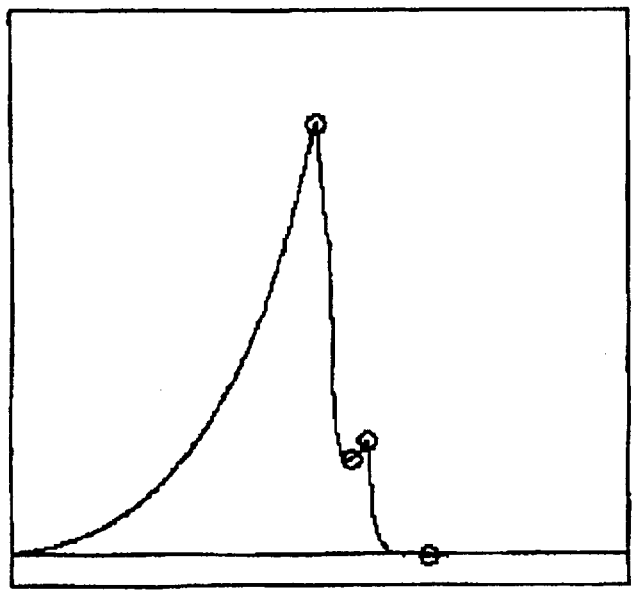
FIG. 1 shows a stress pattern obtained when hardness of tofu sample No. 1 in Test Example was measured with Tensipresser.
Figure 2:
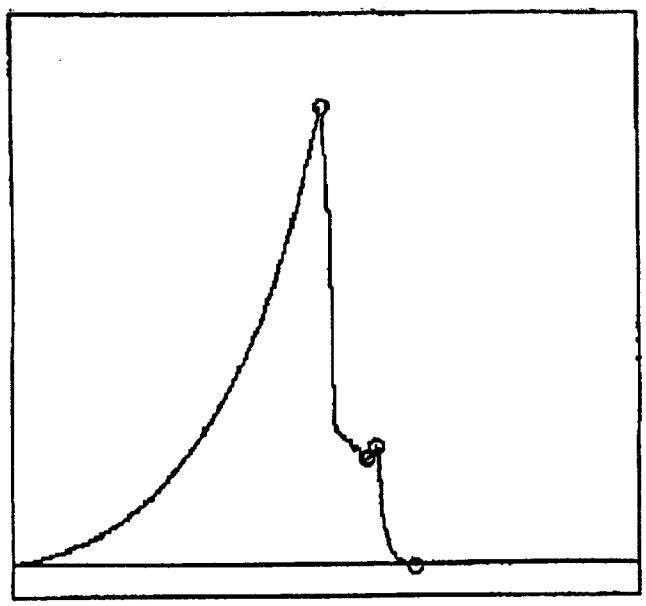
FIG. 2 shows a stress pattern obtained when hardness of tofu sample No. 3 in Test Example was measured with Tensipresser.
Figure 3:
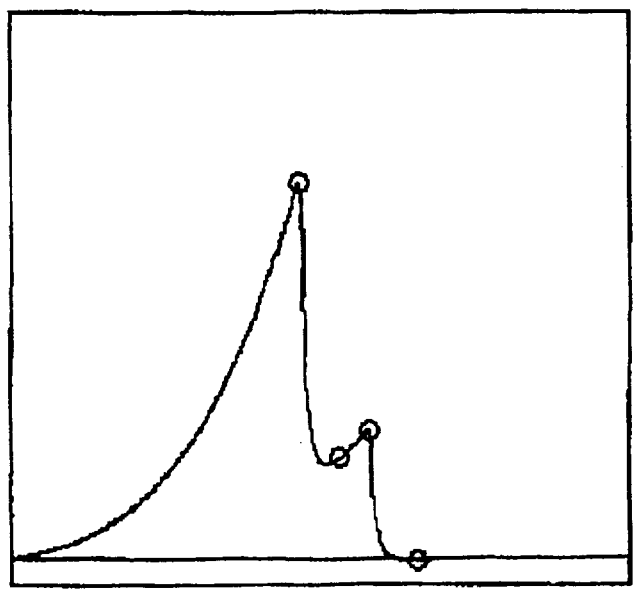
FIG. 3 shows a stress pattern obtained when hardness of tofu sample No. 5 in Test Example was measures with Tensipresser.
Figure 4:
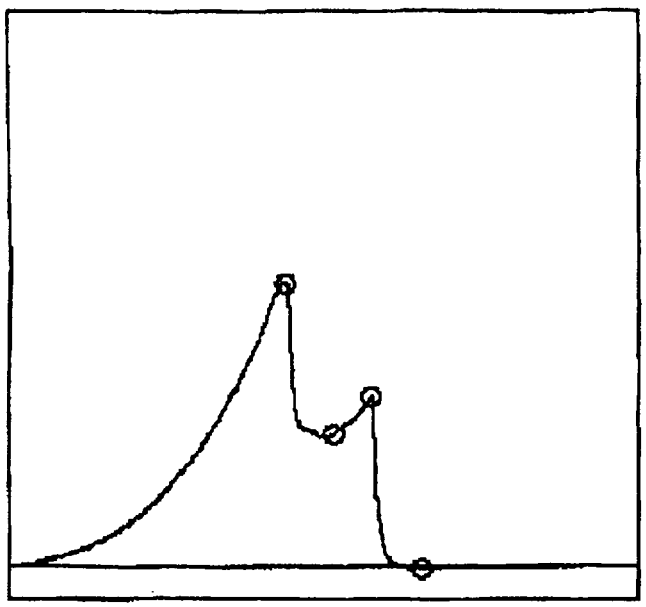
FIG. 4 shows a stress pattern obtained when hardness of tofu sample No. 7 in Test Example was measured with Tensipresser.
Figure 5:
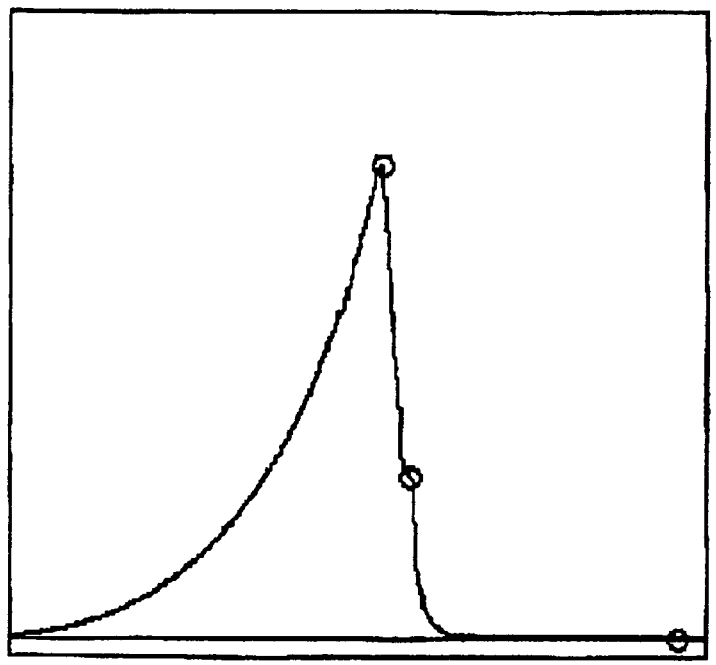
FIG. 5 shows a stress pattern obtained when hardness of tofu sample No. 9 in Test Example was measured with Tensipresser.

Soybean milk used as a starting material is prepared in a conventional manner. That is, soaked soybeans, skinned soybeans or unsoaked soybeans are ground in a grinder together with water, and the resulting slurry is heated at 85 to 120° C. for about 0.1 to 10 minutes, followed by filtration to obtain soybean milk.

Although most of the microorganisms attached to soybeans are killed by the heat treatment, presence of heat-resistant soil bacteria or heat-resistant soil endospores is expected. Therefore, the soybean milk can be subjected to ultra high temperature (UHT) treatment at 130 to 160° C. for 1 to 20 seconds to prepare sterile soybean milk. The protein concentration of soybean milk is 4 to 10% by weight, preferably 5 to 8% by weight. If desired, the protein concentration of soybean milk can be adjusted by addition of isolated soybean protein.

The soybean milk thus prepared is cooled to 2 to 15° C., preferably 5 to 10° C., and a coagulant is added thereto. Addition of a coagulant is effected in a conventional manner. For example, it is added to and mixed with soybean milk in a storage tank or it is continuously fed to soybean milk while sent through a pipe.

Coagulants which can be used include a natural coagulant, magnesium chloride, magnesium sulfate, calcium chloride, calcium sulfate, calcium primary phosphate, calcium lactate, and transglutaminase. One or more than one of them are added to soybean milk in an appropriate concentration.

The soybean milk to which the coagulant has been added is heated primarily. The heating temperature ranges from 20 to 50° C. The higher the heating temperature is, the greater texture changes. However, if the heating temperature is too high, coagulation will proceed before the soybean milk is packed into a container, which makes it difficult to pack the soybean milk into a container and also resulting in deterioration of quality. Further, it should be noted that coagulation proceeds if heating is continued for too long a time at an elevated temperature. Whatever heating conditions may be, the primary heating must be ceased before coagulation takes place.

The primary heating is carried out in an indirect heating system using a plate heater, a tubular heater, etc. with a heating medium such as steam and hot water. The texture of finally obtained tofu can be selected freely by changing (1) the primary heating temperature by changing the temperature of the heating medium such as steam or hot water, (2) controlling the retention time of the soybean milk in a tubular heater or (3) changing the mixed state during the heating.

Immediately after the primary heating, the soybean milk is packed and sealed into a container and then subjected to secondary heating to complete coagulation. The secondary heating is carried out in the same manner as in the general production of packed tofu. For example, the packed soybean milk is heated at 55 to 110° C. for 5 to 120 minutes, followed by cooling to give a final product.

Where the secondary heating at 55° C. or higher is performed in plural stages, it is possible to reduce the time required for coagulation and also to make a further variation in tofu texture. For example, variety can be added to the texture by heating at 55 to 70° C. for 10 to 30 minutes and then at 75 to 90° C. for 10 to 30 minutes.

The present invention will now be illustrated in greater detail with reference to Test Example and Examples. Unless otherwise noted, all the percents are by weight.

TEST EXAMPLE

Whole soybeans (100 kg) were washed with water, soaked in water overnight, and ground in a horizontal grinder while pouring 400 l of water. Immediately after grinding, the resulting slurry was heated in a heater provided in the discharge pipe of the grinder at 105° C. for 30 seconds. After cooling to 80° C., the solid matter was separated by means of a screw decanter. The resulting soybean milk was degassed in a vacuum container (degree of vacuum: 500 mmHg), followed by cooling to 10° C. To the cooled soybean milk were added magnesium chloride and calcium chloride in concentrations of 0.25% and 0.05%, respectively. The soybean milk had a protein concentration of 6.5%.

The soybean milk containing the coagulant was heated primarily under the conditions shown in Table 1 below and then packed into a plastic container and sealed. Immediately after sealing, the container was put in a hot water bath at 80° C. for 50 minutes to induce a coagulation reaction. The container was transferred to a cooling bath to cool to 15° C.

The primary heating was carried out by means of a double wall tubular heater equipped with a static stirrer. In Table 1, "(heating) temperature" is the temperature of the soybean milk at the time of being packed into a container, and "(heating) time" is the retention time in the tubular heater.

The resulting packed tofu samples were designated sample Nos. 1 to 8. For comparison, tofu sample No. 9 was prepared in the same manner as described above, except that the primary heating was not conducted.

The samples were kept at 5° C. overnight, and the hardness of the tofu sample was measured according to the following method. The obtained results are shown in Table 1.

Method of Hardness Measurement:

Five 17-mm cubes were cut out of each sample, and the cube was pressed with a disc plunger (diameter: 40 mm) in Tensipresser (manufactured by Taketomo Electric Inc.). The average of total stress until rupture (erg/cm$^2$) (n=5) was taken as the hardness of tofu. The stress pattern of sample Nos. 1, 3, 5, 7 and 9 are shown in FIGS. 1 through 5.

TABLE 1

| Sample No. | Primary Heating Conditions | | Hardness |
| | Temp. (° C.) | Time (sec) | (×10$^6$ erg/cm$^2$) |
| --- | --- | --- | --- |
| 1 | 20 | 15 | 8.62 |
| 2 | 20 | 30 | 8.04 |
| 3 | 30 | 15 | 8.98 |
| 4 | 30 | 30 | 8.30 |
| 5 | 40 | 15 | 7.52 |
| 6 | 40 | 30 | 6.46 |
| 7 | 50 | 15 | 4.08 |
| 8 | 50 | 30 | 4.00 |
| 9 (comparison) | — | — | 7.40 |

As can be seen from Table 1 and FIGS. 1 to 5, the packed tofu prepared by the process of the present invention (sample Nos. 1 to 8) has varied hardness different from the hardness of the comparative tofu (sample No. 9). Each of the Tensipresser stress patterns of packed tofu of the present invention is also different from that of the comparative tofu. A Tensipresser pattern shows a first peak at which a cubic sample is ruptured and a second peak (a maximum compression point at which the 17 mm high cube having ruptured is further compressed to a height of 5 mm). It appears that a smaller second peak indicates a more uniform tofu structure, that is, a higher second peak shows a less uniform structure. This difference in stress pattern is indicative of a delicate difference in texture.

Where heating is conducted in a single stage as in a conventional process, the soybean milk coagulates uniformly and slowly as a whole to have a uniform texture. To the contrary, where heating is conducted in two stages, the tofu structure becomes non-uniform, which seems to be manifested as a delicate difference in texture.

Example 1

Whole soybeans (300 kg) were washed with water, soaked in water overnight, and ground in a horizontal grinder at a low temperature while pouring 1100 l of water of 5° C. Immediately after grinding, the resulting slurry was preliminarily heated in a double wall tubular heater provided in the discharge pipe of the grinder and then heated to 108° C. by means of a steam injection heater fitted to the same double wall tube, at which the slurry was kept for 30 seconds. After cooling to 90° C., the solid matter was separated by means of a screw decanter. The resulting soybean milk was degassed in a vacuum container (degree of vacuum: 65 mmHg), followed by cooling to 10° C. The protein concentration of the soybean milk was 6.6%.

A 50% aqueous solution of natural bittern (magnesium content: 61,000 ppm; calcium content: 300 ppm) was added to the cooled soybean milk (5° C.) in an amount of 6 ml per liter of the soybean milk and mixed. The mixture was primarily heated in a tubular heater, packed into a 300 ml-volume plastic container, and sealed. The temperature of the soybean milk at the time of packing was 30° C., and the heating time (the retention time of the soybean milk in the tubular heater) was 20 seconds. Immediately after the sealing, the container was kept in hot water at 70° C. for 60 minutes (secondary heating) to complete coagulation, followed by cooling with cold water to obtain a packed tofu product. The resulting tofu had a hardness of $7.84 \times 10^6$ erg/cm$^2$ as measured in the same manner as in Test Example.

Example 2

The same bittern-containing soybean milk as prepared in Example 1 was primarily heated at 40° C. for 15 seconds in a tubular heater, packed into a 300-ml volume plastic container, and sealed. Immediately after the sealing, the soybean milk in the container was secondarily heated at 60° C. for 30 minutes and then at 80° C. for 30 minutes to complete coagulation, followed by cooling with cold water to obtain a packed tofu product. The resulting tofu had a hardness of $7.05 \times 10^6$ erg/cm$^2$ as measured in the same manner as in Test Example.

Example 3

Whole soybeans (100 kg) were washed with water, soaked in water overnight, and ground in a horizontal grinder at a low temperature while pouring 400 l of water. Immediately after grinding, the resulting slurry was heated at 105° C. for 30 seconds in a heater provided in the discharge pipe of the grinder. After cooling to 80° C., the solid matter was separated by means of a screw decanter.

The resulting soybean milk was degassed in a vacuum container (degree of vacuum: 500 mmHg), followed by cooling to 10° C. To the cooled soybean milk were added magnesium chloride and calcium chloride in concentrations of 0.25% and 0.05%, respectively. The protein concentration of the soybean milk was 6.5%.

The soybean milk containing the coagulant was primarily heated at 25° C. for 20 seconds in a double wall tubular heater equipped with a static mixer and packed into a plastic container (11×11×3 cm). The heating temperature was the temperature of the soybean milk at the time of packing into the container, and the heating time was the retention time in the tubular heater. Immediately thereafter, the soybean milk was secondarily heated in a steam chamber set at 80° C. for 50 minutes to coagulate. The resulting tofu was transferred into a plastic container for distribution (11.5×11.5×3.5 cm), clean water was put into the container, and the container was completely sealed with a plastic sheet. The container and the contents were cooled to 10° C. in a cooling tank. For comparison, tofu was prepared in the same manner as described above, except that the primary heating was not carried out.

After keeping the resulting tofu at 5° C. overnight, the hardness was measured in the same manner as in Test Example. Further, cohesiveness of the tofu was measured as follows.

Figure 6:
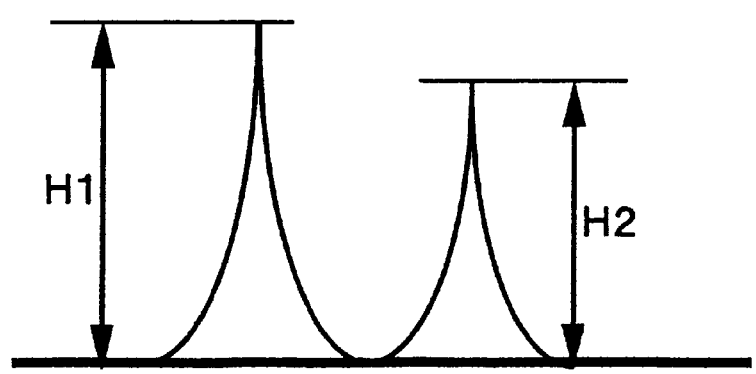
FIG. 6 is a diagram illustrating cohesiveness of tofu.

Method of Measuring Cohesiveness:

A 17-mm cube was cut out of each sample, and the cube was put on Tensipresser (manufactured by Taketomo Electric Inc.) and pressed twice with a disc plunger (diameter: 40 mm) to a height of 9 mm to obtain the respective stress patterns. A ratio of the peak height (H2) of the second stress pattern to the peak height (H1) of the first stress pattern, H2/H1, was taken as an indication of cohesiveness (see FIG. 6). As the H2/H1 ratio approaches 1.0, the tofu structure can be seen as more uniform. As the ratio gets apart from 1.0, the structure can be seen as less uniform.

Furthermore, the palatability of tofu was organoleptically tested by 20 panelists and evaluated by the number of the panelists who judged palatable. The results of the measurement and evaluation are shown in Table 2 below.

TABLE 2

| Sample | Primary Heating Conditions | | Measurement with Tensipresser | | Organoleptic Test |
| --- | --- | --- | --- | --- | --- |
| | Temp. (° C.) | Time (sec) | Hardness (× 10$^6$ erg/cm$^2$) | Cohesiveness (H2/H1) | |
| Invention | 25 | 20 | 8.84 | 0.78 | 18 |
| Comparison | — | — | 7.95 | 0.90 | 2 |

As is apparent from Table 2, the silken tofu prepared by the process of the present invention is different from the comparative tofu in hardness and cohesiveness. The difference in cohesiveness exerts a delicate influence on the palatability, which is believed to be manifested in the results of the organoleptic test.

Example 4

Whole soybeans (300 kg) were washed with water, soaked in water overnight, and ground in a horizontal grinder at a low temperature while pouring 1400 l of water of 5° C. Immediately after grinding, the resulting slurry was preliminarily heated in a double wall tubular heater provided in the discharge pipe of the grinder, heated at 105° C. for 30 seconds by a steam injection heater fitted to the same double wall tube. After cooling to 90° C., the solid matter was separated by means of a screw decanter to obtain soybean milk. The resulting soybean milk was degassed in a vacuum container (degree of vacuum: 65 mmHg), followed by cooling to 10° C. The protein concentration of the soybean milk was 5.5%.

To the cooled soybean milk (10° C.) were added a 50% aqueous solution of magnesium chloride ($MgCl_2.6H_2O$) and a 50% aqueous solution of calcium chloride ($CaCl_2.2H_2O$)

in amounts of 5 ml and 1 ml, respectively, per liter of the soybean milk. The mixture was primarily heated in a tubular heater and packed into a 600 ml-volume plastic container. The temperature of the soybean milk at the packing was 30° C., and the heating time (the retention time in the tubular heater) was 15 seconds.

Immediately after the packing, the mixture was completely coagulated by secondary heating with steam at 90° C. for 60 minutes. The coagulated mixture was once collapsed, transferred to a draining container made of porous boards and pressed from the upper side for 30 minutes to remove 190 ml of water. The thus shaped tofu weighing about 400 g was taken out of the container and transferred to a plastic container for distribution. Clean water was put into the container, and the container was sealed and cooled to 10° C. in a cooling bath. The resulting product had a hardness of $1\times10^7$ erg/cm$^2$ as measured in the same manner as in Test Example.

What is claimed is:

1. A process for producing tofu having a satisfactory palatability, which comprises the steps of:
   a) sterilizing soybean milk by heating said soybean milk to a temperature ranging from 130° C. to 160° C. for a time sufficient to obtain sterile soybean milk;
   b) cooling the sterile soybean milk to a temperature ranging from 2° C. to 15° C. to obtain a cooled soybean milk;
   c) adding a coagulant to the cooled soybean milk to obtain a mixture of coagulant and cooled soybean milk;
   d) raising the temperature of the mixture from 2–15° C. to a first temperature ranging from 20–50° C. by subjecting the mixture to a primary heating with a heating apparatus to obtain a primarily heated soybean milk, said primary heating being discontinued before coagulation takes place;
   e) packing and sealing the primarily heated soybean milk into a container to obtain a sealed soybean milk; and
   f) subjecting the sealed soybean milk to a secondary heating at a second temperature ranging from 55° C. to 110° C. for a time sufficient to obtain a coagulated product.

2. The process according to claim 1, wherein the time for sterilizing the soybean milk is between 1 and 20 seconds.

3. The process according to claim 1, wherein the coagulant is selected from the group consisting of a natural coagulant, magnesium chloride, magnesium sulfate, calcium chloride, calcium sulfate, calcium primary phosphate, calcium lactate, transglutaminase, and mixtures thereof.

4. The process according to claim 1, wherein the secondary heating is carried out for a period ranging between 5 and 120 minutes.

5. The process according to claim 1, wherein the secondary heating is carried out in plural stages.

6. The process according to claim 5, wherein the plural stages comprise a first stage at 55° C. to 70° C. for 10 to 30 minutes, and a subsequent stage at 75° C. to 90° C. for 10 to 30 minutes.

7. The process according to claim 1, further comprising cooling the coagulated product to obtain a final packed tofu product.

* * * * *